United States Patent
Rizko

(10) Patent No.: US 7,868,879 B2
(45) Date of Patent: Jan. 11, 2011

(54) METHOD AND APPARATUS FOR SERVING AUDIOVISUAL CONTENT

(75) Inventor: Camille Rizko, Burbank, CA (US)

(73) Assignee: Doremi Labs, Inc., Burbank, CA (US)

( * ) Notice: Subject to any disclaimer, the term of this patent is extended or adjusted under 35 U.S.C. 154(b) by 1279 days.

(21) Appl. No.: 11/433,251

(22) Filed: May 12, 2006

(65) Prior Publication Data

US 2007/0263937 A1      Nov. 15, 2007

(51) Int. Cl.
    *G06F 3/038*        (2006.01)
(52) U.S. Cl. .................. 345/204; 348/739; 348/744
(58) Field of Classification Search .............. 345/204; 382/100, 236; 348/739, 744, 759, 760, 761
    See application file for complete search history.

(56) References Cited

U.S. PATENT DOCUMENTS

| 7,203,635 | B2 | 4/2007 | Olover et al. | |
|---|---|---|---|---|
| 7,233,347 | B2 | 6/2007 | Jones et al. | |
| 2003/0020671 | A1 | 1/2003 | Santoro et al. | |
| 2003/0208466 | A1* | 11/2003 | Stern | 707/1 |
| 2004/0008893 | A1* | 1/2004 | Itoi et al. | 382/236 |
| 2004/0111631 | A1* | 6/2004 | Kocher et al. | 713/194 |
| 2005/0074063 | A1* | 4/2005 | Nair et al. | 375/240.11 |
| 2005/0122335 | A1 | 6/2005 | MacInnis et al. | |
| 2005/0123045 | A1* | 6/2005 | Hannuksela | 375/240.12 |
| 2005/0140694 | A1 | 6/2005 | Subramanian et al. | |
| 2006/0159303 | A1* | 7/2006 | Davis et al. | 382/100 |
| 2006/0170778 | A1* | 8/2006 | Ely et al. | 348/207.99 |
| 2006/0222203 | A1* | 10/2006 | Mercier | 382/100 |
| 2006/0268012 | A1 | 11/2006 | MacInnis et al. | |
| 2006/0271990 | A1* | 11/2006 | Rodriguez et al. | 725/118 |
| 2007/0143800 | A1* | 6/2007 | Salomons | 725/74 |

FOREIGN PATENT DOCUMENTS

| JP | 2000-004455 | 1/2000 |
|---|---|---|
| JP | 2001-054140 | 2/2001 |
| JP | 2004-312780 | 11/2004 |
| JP | 2005-051547 | 2/2005 |

\* cited by examiner

*Primary Examiner*—Kimnhung Nguyen
(74) *Attorney, Agent, or Firm*—O'Melveny & Myers LLP

(57) ABSTRACT

An apparatus for serving audiovisual content comprises a parser, a decompression module, a packaging module, and a transmission module. The parser is adapted to receive an image data file and separate the image data file into a first compressed image component and a second compressed image component. The decompression module is coupled to the parser and adapted to decompress the first compressed image component into an uncompressed image component. The packaging module is coupled to the decompression module and adapted to package the uncompressed image component into a data stream having plural data fields arranged in a format defined in accordance with an industry-accepted standard and the second compressed image component into unused ones of said plural data fields, for transmission over a data interface. The transmission module is coupled to the packaging module and adapted to transmit the data stream over the data interface.

46 Claims, 13 Drawing Sheets

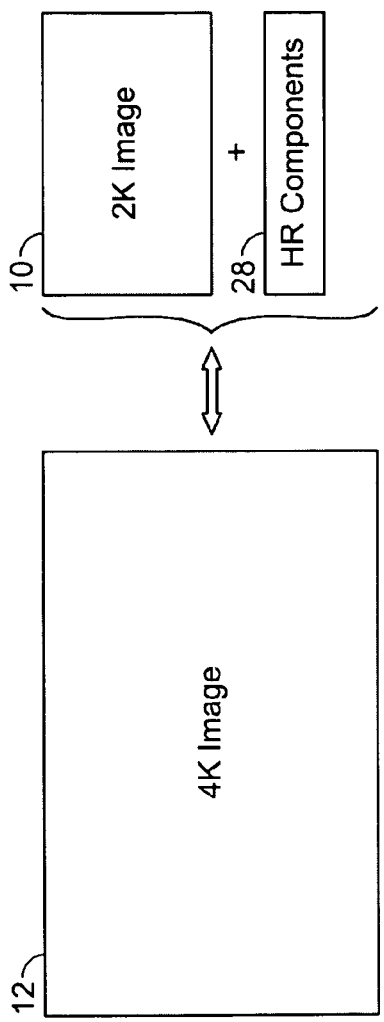
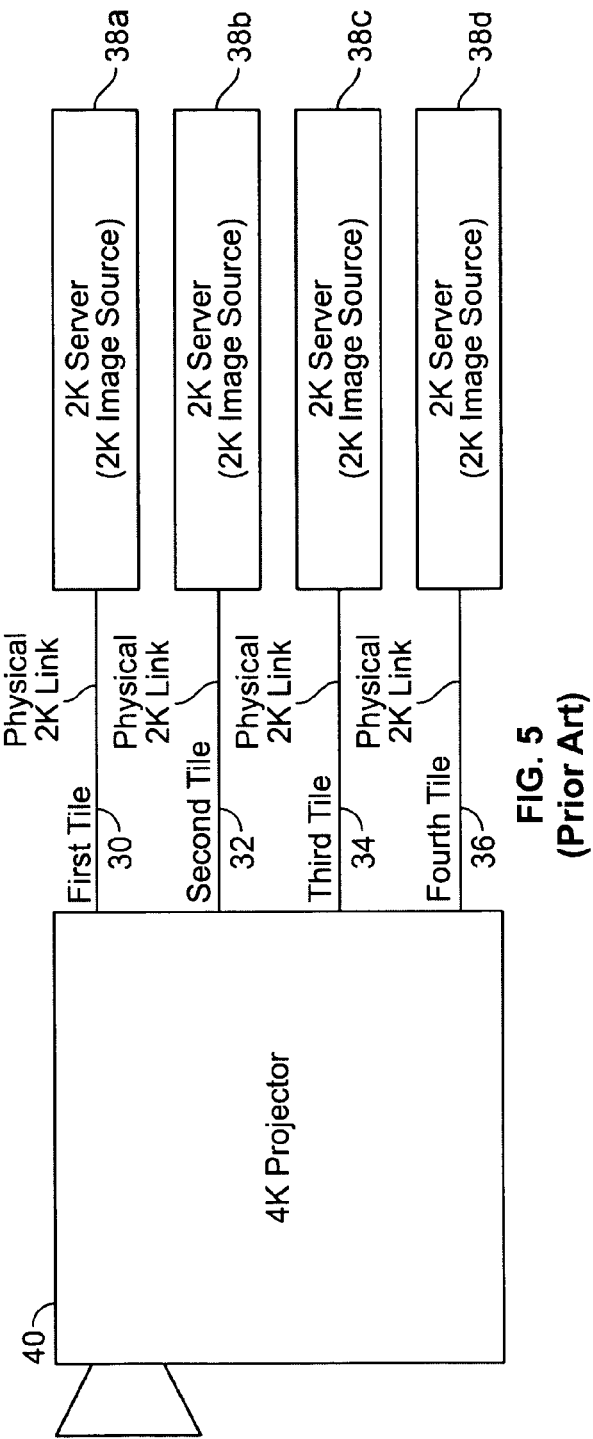
FIG. 4
(Prior Art)
FIG. 5
(Prior Art)

| Sample Number | 0 | 1 | 2 | 3 | 4 | 5 |
|---|---|---|---|---|---|---|
| Link A 70 | Y left: 2-11 | Y left: 2-11 | Y left: 2-11 | Y left: 2-11 | Y left: 2-11 | Y left: 2-11 |
| | Y left: 0-1 | Y left: 0-1 | Y left: 0-1 | Y left: 0-1 | Y left: 0-1 | Y left: 0-1 |
| | Spare 8bits | Spare 8bits | Spare 8bits | Spare 8bits | Spare 8bits | Spare 8bits |
| Link B 72 | Y right: 2-11 | Y right: 2-11 | Y right: 2-11 | Y right: 2-11 | Y right: 2-11 | Y right: 2-11 |
| | Y right: 0-1 | Y right: 0-1 | Y right: 0-1 | Y right: 0-1 | Y right: 0-1 | Y right: 0-1 |
| | Spare 8bits | Spare 8bits | Spare 8bits | Spare 8bits | Spare 8bits | Spare 8bits |

FIG. 15

METHOD AND APPARATUS FOR SERVING AUDIOVISUAL CONTENT

BACKGROUND OF THE INVENTION

1. Field of the Invention

The present invention relates to digital imaging systems, and more particularly, to a method and apparatus for serving high resolution and high frame rate image data files to a digital display using a standard lower resolution server.

2. Description of Related Art

The concept of "digital cinema" includes the production, delivery and presentation of audio/visual material in auditoriums or theatres using digital technology. A digitally produced or digitally converted movie is typically distributed in a compressed and encrypted form on physical media such as DVD-ROM, tape or computer hard drives and can, in principle, be distributed by electronic transmission using satellite or other broadband communication paths.

Digital cinema systems are often used in commercial movie theaters in order to play back and display feature films at a quality comparable with that of 35 mm film release prints. Such systems typically comprise a digital video display device, such as a digital video projector, for screening of digitized audiovisual content, and a playback server that feeds digital content to the display device. Content is supplied from the server to the display device over one or more video links, such as a dual-link High-Definition Serial Digital Interface (HD-SDI) in order to provide the bandwidth necessary to transfer higher resolution content from the playback server to the display device.

Storage and media block are two components of the theater playback system. Storage is the image server that holds the packaged content for eventual play back. The media block is the hardware device (or devices) that converts the packaged content into the streaming data that ultimately turns into the pictures and sound in the theater. These two components can be physically combined together in an integrated system or the components can be physically separate from each other. The term "server" will be used to indicate both storage and media block contained in a single device.

Current digital cinema systems support 2K (2048×1080) resolution images. There is currently a push to move to higher resolutions such as 4K (4096×2160) in order to provide a final product that is true to the original material. However, there are technical challenges to implement such systems as will be described in more detail.

FIG. 1 illustrates the dimensions of a 2K resolution image 10, while FIG. 2 illustrates the dimensions of a 4K resolution image 12. A 2K image 10 is comprised of an array of pixels, 2048 pixels wide by 1080 pixels high. A 4K image 12 is comprised of an array of pixels, 4096 pixels wide by 2160 pixels high. The dimensions of a 4K resolution image 12 correspond to four times the dimensions of a 2K resolution image 10. Therefore, a 4K resolution image 12 can be cut into four 2K resolution images: one top left 2K image 20, one top right 2K image 22, one bottom left 2K image 24, and one bottom right 2K image 26, as illustrated in FIG. 3. The source image is partitioned into rectangular non-overlapping blocks in a process called tiling. Each tile is 2048 pixels wide by 1080 pixels high. Each tile is then compressed independently as though the tile was an entirely independent image.

Digitized movies are typically distributed from production companies as a compressed 4K resolution image according to the specifications of Digital Cinema Initiatives (DCI). DCI is a joint venture of Disney, Fox, MGM, Paramount, Sony Pictures Entertainment, Universal and Warner Bros. Studios, which documents voluntary specifications for an open architecture for digital imaging. The compressed image is then typically stored in the digital imaging system for later viewing.

DCI specifies that 4K resolution images are to be delivered compressed and the compression standard used should be JPEG 2000 (Joint Photographic Experts Group). The JPEG 2000 algorithm compresses the image by generating a 2K resolution uncompressed image along with compressed higher resolution enhancement components (HR components). FIG. 4 illustrates that a 4K resolution image 12 can be compressed to create an equivalent 2K resolution image 10 along with HR components 28. The 4K resolution image 12 can be reconstituted directly from the 2K resolution image 10 with HR components 28. Once compressed, the 4K higher resolution image 12 can later be reconstructed by combining the 2K resolution image 10 and the compressed HR components 28 together.

Two methods are currently used to display the stored 4K resolution images in the digital cinema system. In a first method, illustrated in FIG. 5, each compressed 4K resolution image that is received is reconstituted into an uncompressed 4K resolution image and is subsequently cut into four tiles: the top left tile 30, the top right tile 32, the bottom left tile 34, and the bottom right tile 36. Each tile is then stored on one of four 2K servers 38a-38d. The result is audiovisual content made of four images. Each image is transferred from a separate 2K image server 38a-38d connected to a digital 4K projector 40 via individual 2K links. As separate servers are used, the images must be synchronized with one another using a time code source signal so that the projector can synchronize the images together to prevent misalignment of frames.

The first method is not optimal as the four image servers 38a-38d have to be synchronized with each other to ensure the tiles play simultaneously. The first method is also costly as the method requires four 2K servers 38a-38d in addition to a special process used to generate the four tiles. As a result, this method is generally not deployed in theatres due to its high complexity and cost.

In a second method, shown in FIG. 6, the digitized audiovisual content is stored on a 4K server 42 as a single package that contains the 2K resolution image and the 4K compressed high resolution component. The 4K server 42 reconstructs the 4K resolution image from the compressed components and then internally separates the image into the four tiles 30, 32, 34, 36 to be transmitted to the projector 40. This second method offers the advantage of storing the audiovisual content in a simple package; however, its disadvantage is in the cost of the server, which is significantly higher than the cost of the more standard 2K servers available on the market. 4K servers are a much newer technology with fewer models commercially available than the standard 2K servers and requiring higher storage capacities, which drives up the cost of the server. In addition, the connection still requires four physical 2K links to transport the 4K resolution image to the projector 40.

As digital imaging systems move towards providing 4K content from the server to the display device, alternate imaging display processes, such as "Digital 3-D" are making the same move to provide higher image quality. "Digital 3-D" is a term used in digital imaging to describe stereoscopic images, where alternating left and right images are displayed on a 2-D screen. A method for viewing these images is employed such that each eye only sees the intended images. The result is that the left eye sees a slightly different image from the right eye, providing the stereoscopic effect.

Stereoscopic content is currently supplied over a dual-link HD-SDI connection as a 2K resolution 4:2:2 10-bit quality signal. Chroma subsampling in a video system is usually expressed as a three part ratio (I.e. 4:2:2). The three terms of the ratio are: the number of brightness samples, followed by the number of samples of the two color components for each complete sample area. For 4:2:2 subsampling, each of the two color-difference channels has half the sample rate of the brightness channel, so horizontal color resolution is only half that of 4:4:4 subsampling. To view stereoscopic content today, a stereoscopic display device is typically used in conjunction with a server similar to that of current 2K systems. The stereoscopic image is sent at a higher frame rate (e.g., 48 frames per second) than typically used for standard content (e.g., 24 frames per-second) and is separated into left eye and right eye components and then interleaved into one data stream. The data stream is then transmitted to the display device that actually displays two images. Special glasses, such as polarized or liquid crystal display (LCD) glasses, cause one of the images to enter one eye and the other to enter the other eye.

Similarly, high frame rate non-stereoscopic images, such as 48 frame-per-second (fps) content, have the same limitations as stereoscopic content and can only be supplied currently as a 2K resolution 4:2:2 10-bit quality signal over a dual-link HD-SDI connection. In order to provide better image quality for non-stereoscopic high frame rate content and stereoscopic content, it would be advantageous to provide a higher quality, high frame rate system that allows for a 2K resolution 4:4:4 12-bit quality signal.

There is a need for a way to leverage existing 2K server technology in order to reduce costs and allow a single server to support both 2K and 4K display. Likewise, there is a need to provide higher frame rate images while utilizing the same 2K server technology.

SUMMARY OF THE INVENTION

The present invention provides a method, apparatus and system for serving high resolution and high frame rate image data files to a digital projector using a standard lower resolution server that overcomes the aforementioned drawbacks of the prior art. Digital cinema will be used as an exemplary application, however, the present invention may also apply to other digital imaging applications.

In an embodiment of the invention, a method for serving audiovisual content comprises the steps of: (a) receiving an image data file; (b) parsing the image data file into a first compressed image component and a second compressed image component; (c) decompressing the first compressed image component into an uncompressed image component; (d) packaging the uncompressed image component into a data stream having plural data fields arranged in a format defined in accordance with an industry-accepted standard and the second compressed image component into unused ones of said plural data fields; and (e) transmitting the data stream over a data interface.

In another embodiment of the invention, an apparatus for serving audiovisual content comprises a parser, a decompression module, a packaging module, and a transmission module. The parser is adapted to receive an image data file and separate the image data file into a first compressed image component and a second compressed image component. The decompression module is coupled to the parser and adapted to decompress the first compressed image component into an uncompressed image component. The packaging module is coupled to the decompression module and adapted to package the uncompressed image component into a data stream having plural data fields arranged in a format defined in accordance with an industry-accepted standard and the second compressed image component into unused ones of said plural data fields; for transmission over a data interface. The transmission module is coupled to the packaging module and adapted to transmit the data stream over the data interface.

In yet another embodiment of the invention, a system for displaying audiovisual content comprises a server, a conversion circuit, and a display device. The server is adapted to receive an image data file and transmit data stream over a data interface. The server comprises a parser, a decompression module, a packaging module, and a transmission module. The parser is adapted to receive the image data file and separate the image data file into a two compressed image components. The decompression module is coupled to the parser and is adapted to decompress the compressed image component. The packaging module is coupled to the decompression module and is adapted to package the uncompressed image component into a data stream having plural data fields arranged in a format defined in accordance with an industry-accepted standard and the compressed image component into unused ones of said plural data fields; for transmission over a data interface. The transmission module is coupled to the packaging module and is adapted to transmit the data stream over the data interface.

The conversion circuit is coupled to the server via the data interface and is adapted to receive the data stream and reconstruct the visual portion of the image data file. The conversion circuit comprises a parser, a decompression module, and an image reconstitution module. The parser is coupled to the data interface and adapted to receive and separate the data stream into an uncompressed image component and a compressed image component. The decompression module is coupled to the parser and is adapted to decompress the compressed image component. The image reconstitution module is coupled to the decompression module and is adapted to reconstitute the uncompressed image components into the visual portion of the image data file. The display device is coupled to the conversion circuit and is adapted to receive and display the visual portion of the image data file.

In yet another embodiment of the invention, the image data file may contain stereoscopic content. The stereoscopic image data file is then separated into a compressed right eye luminance component, a compressed left eye luminance component, a compressed right eye color component, and a compressed left eye color component that is subsequently decompressed, packaged, and transmitted. The right eye luminance component and left eye luminance component are packaged into data stream and the right eye color component and left eye color component are packaged into unused ones of said plural data fields of the data stream for transmission over a data interface.

A more complete understanding of the method and apparatus for serving audiovisual content will be afforded to those skilled in the art, as well as a realization of additional advantages and objects thereof, by a consideration of the following detailed description of the preferred embodiments. Reference will be made to the appended sheets of drawings which will first be described briefly.

BRIEF DESCRIPTION OF THE DRAWINGS

FIG. 4 is a diagram of the a 4K image and illustrating how compression creates a 2K image along with HR components;

FIG. 5 is a block diagram of an exemplary digital cinema system currently used for 4K images;

FIG. 15 is a diagram of a channel representation of stereoscopic YCbCr (4:4:4) 12-bit color mode according to an embodiment of the invention;

DETAILED DESCRIPTION OF THE PREFERRED EMBODIMENTS

The present invention overcomes the drawbacks of the prior art by providing a digital imaging system that utilizes existing 2K server technology for storage and transport of 4K resolution images and high frame rate content between a server and a display device. An advantage of the invention is that a single server can play 2K and 4K Image(s) and exhibitors do not have to carry two types of servers, only one, when connecting to both 2K and 4K display devices. This, in turn, reduces equipment inventory at the theatres and thereby reduces cost. Another advantage is that the same physical link may be used for both 2K and 4K systems. All the technology developed for the 2K system can be re-used for the 4K system with no impact on cost.

Figure 1:
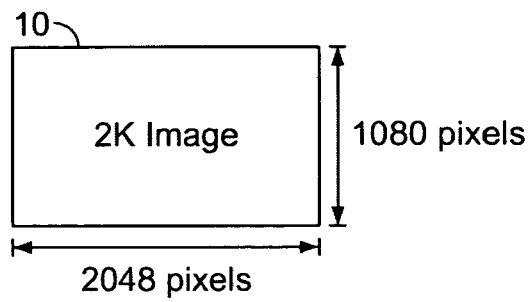
FIG. 1 is a diagram of the dimensions of an exemplary 2K image.
Figure 2:
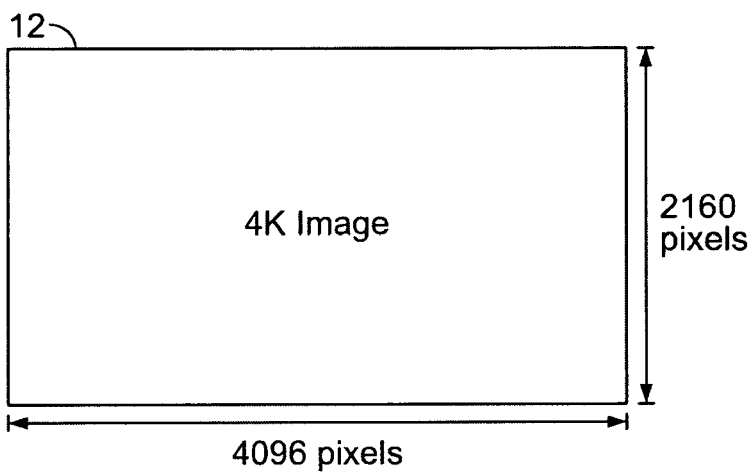
FIG. 2 is a diagram of the dimensions of an exemplary 4K image.
Figure 3:
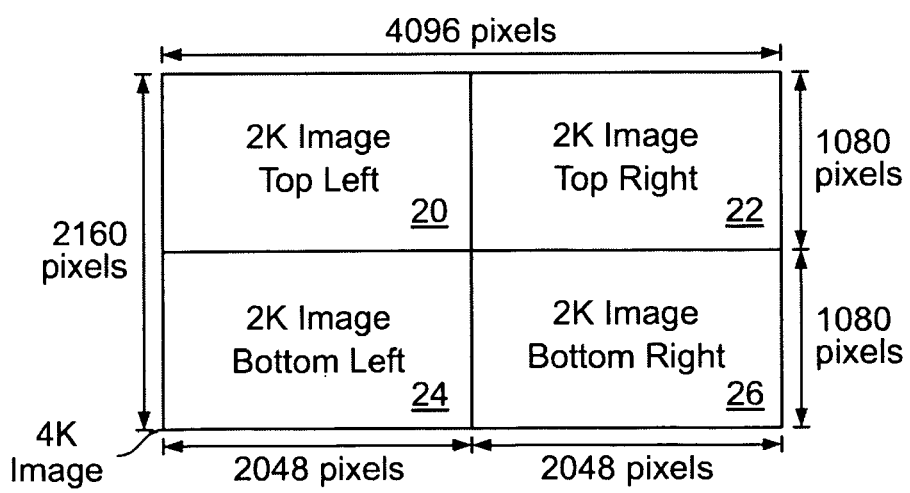
FIG. 3 is a diagram showing a 4K image partitioned into four 2K images.
Figure 6:
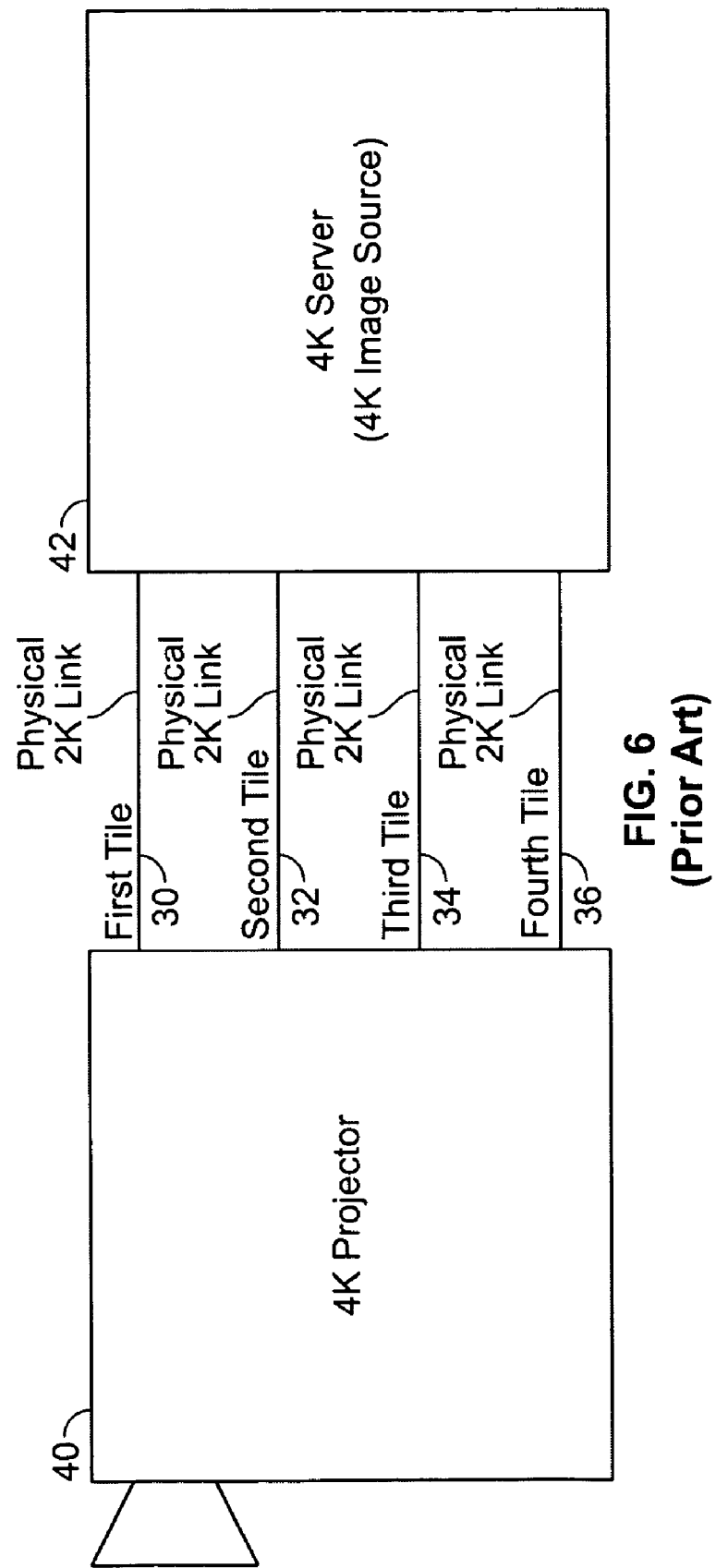
FIG. 6 is a block diagram of an alternate digital cinema system currently used for 4K images.
Figure 7:
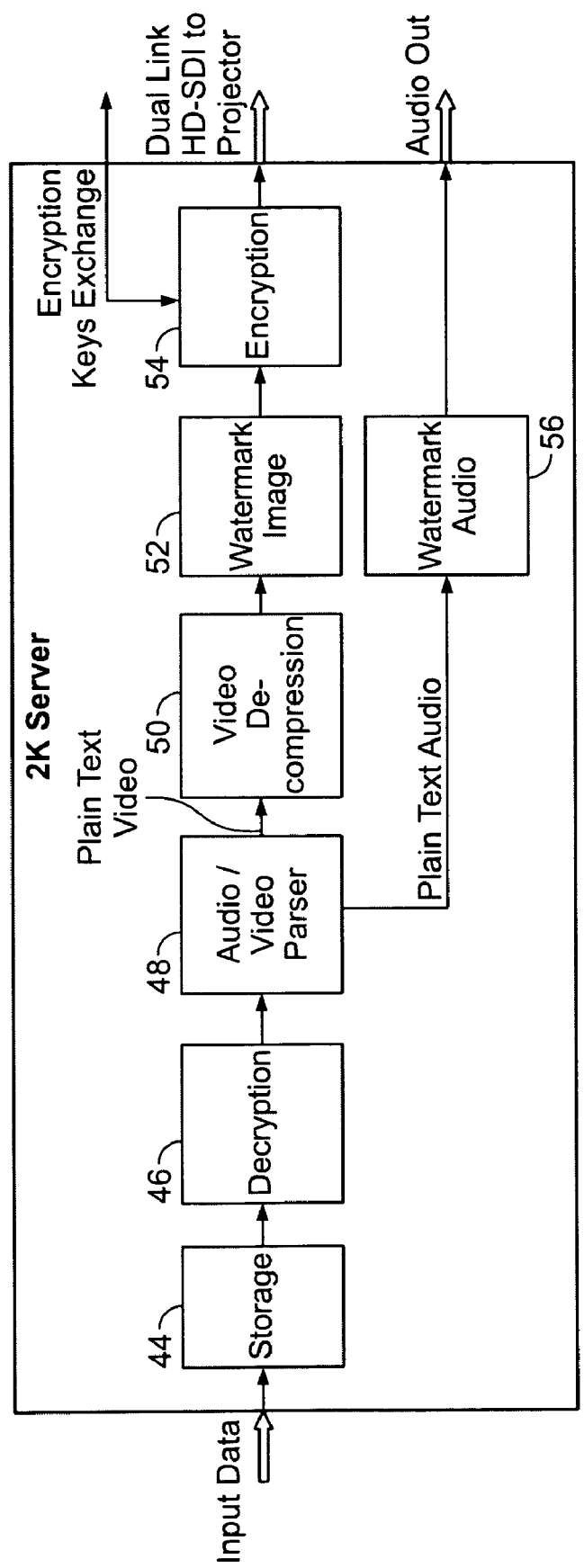
FIG. 7 is a block diagram of a 2K server currently used for 2K images.

A block diagram corresponding to a current implementation of a 2K server is shown in FIG. 7. A 2K server is comprised of the following modules: a storage module 44, a data decryption module 46, an audio/video parser module 48, a decompression engine 50, an image watermarking module 52, an image physical link encryption module 54, and an audio watermarking module 56.

The 2K server receives data at its input and stores the file in the storage module 44. The storage module 44 is coupled to the decryption module 46. If encrypted, the data is decrypted using a security key pre-loaded into the data decryption module 46. Unencrypted data is called "plain text". The decryption module 46 is coupled to the parser 48. The plain text data stream is then parsed to separate the audio from the image. The audio separated by the parser 48 is coupled to the audio watermarking module 56. If watermarking (forensic or otherwise) is required, the audio is watermarked and transferred to an audio processing system. A watermark is a pattern of bits inserted into a digital image, audio or video file that identifies the file's copyright information (author, rights, etc.). Forensic watermark is a variant used to identify the playback source and playback date. The image separated by the parser 48 is coupled to the decompression engine 50. The image stream is then decompressed into a plain text uncompressed 2K resolution image. The decompression engine 50 is coupled to the image watermarking module 52. If an image watermark is required (forensic or otherwise), watermarking is subsequently applied to the image. The image watermarking module 52 is coupled to the encryption module 54. If physical link encryption is required, then encryption is applied to the image. The encryption process is the translation of data into a secret code. Encryption is the most effective way to achieve data security. The encryption method typically used for imaging is AES-128 (Advanced Encryption Standard). The encryption module 54 is coupled to the dual-link HD-SDI connection and the data stream is then transmitted over the data interface.

Figure 8:
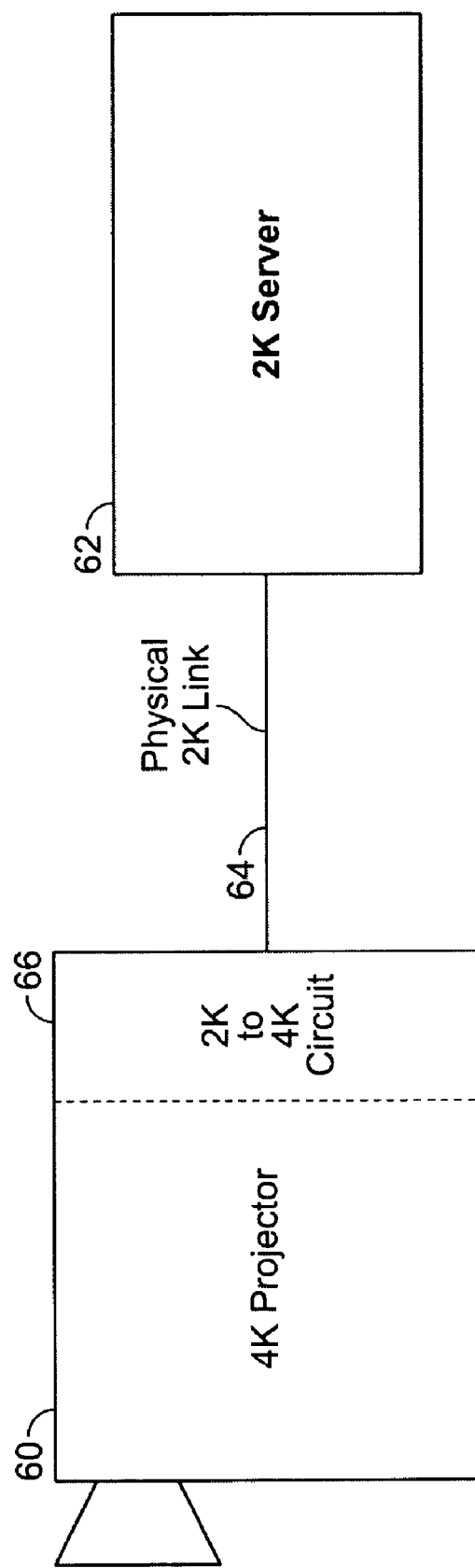
FIG. 8 is a block diagram of a digital imaging system according to an embodiment of the invention.

FIG. 8 illustrates a digital imaging system according to an embodiment of the invention. As specified by DCI for delivery of audiovisual content, a 4K image compressed with wavelet technology (JPEG 2000) has a 2K resolution image section along with compressed HR components. The embodiment of the invention is comprised of the following components: a 2K server 62, a physical 2K link 64, a 2K to 4K circuit 66, and a 4K projector 60. The 2K server 62 receives a compressed 4K image, decompresses only the 2K resolution image portion and then packages and transmits the uncompressed 2K image and the compressed HR components on the physical 2K link 64 that is connected directly between the 2K server 62 and the 4K projector 60. The streaming data transmitted across the physical 2K link 64 is encoded such that unused bits are used to carry the HR component of a high resolution compressed image. The 2K to 4K circuit 66 may be integrated into the projector, may be plug-in circuitry (such as a PCMCIA card) designed for the projector, or may be a stand-alone piece of equipment connected to the input of a standard 4K digital projector.

It is possible to use a single physical 2K link 64 as the 2K link is composed of two HD-SDI links, per SMPTE-372M (Society of Motion Picture and Television Engineers), which are designed to carry a 2K resolution image. The dual link includes two HD-SDI links in which each HD-SDI link is specified according to SMPTE-292M. The dual-link HD-SDI connection has space for 40 bits of data per pixel, 2750 pixels available per line, and 1125 total lines per link. The active image payload size is 1080 lines by 2048 pixels for a 2K resolution image.

Each pixel is represented by a total of 36 bits, or 12 bits per color component, taking into account three color components for color models such as RGB and YCbCr. As each dual-link HD-SDI connection has space for 40 bits of data per pixel, four bits per pixel are designated as spare bits and are made available to carry additional data. One of the four bits is used in order to avoid forbidden words such as 0000000000 and 1111111111. This allows at least three bits per pixel of "active data" available for proprietary use. An embodiment of the invention uses the three spare bits per pixel to transport the 4K high resolution compressed HR components.

Figure 9:
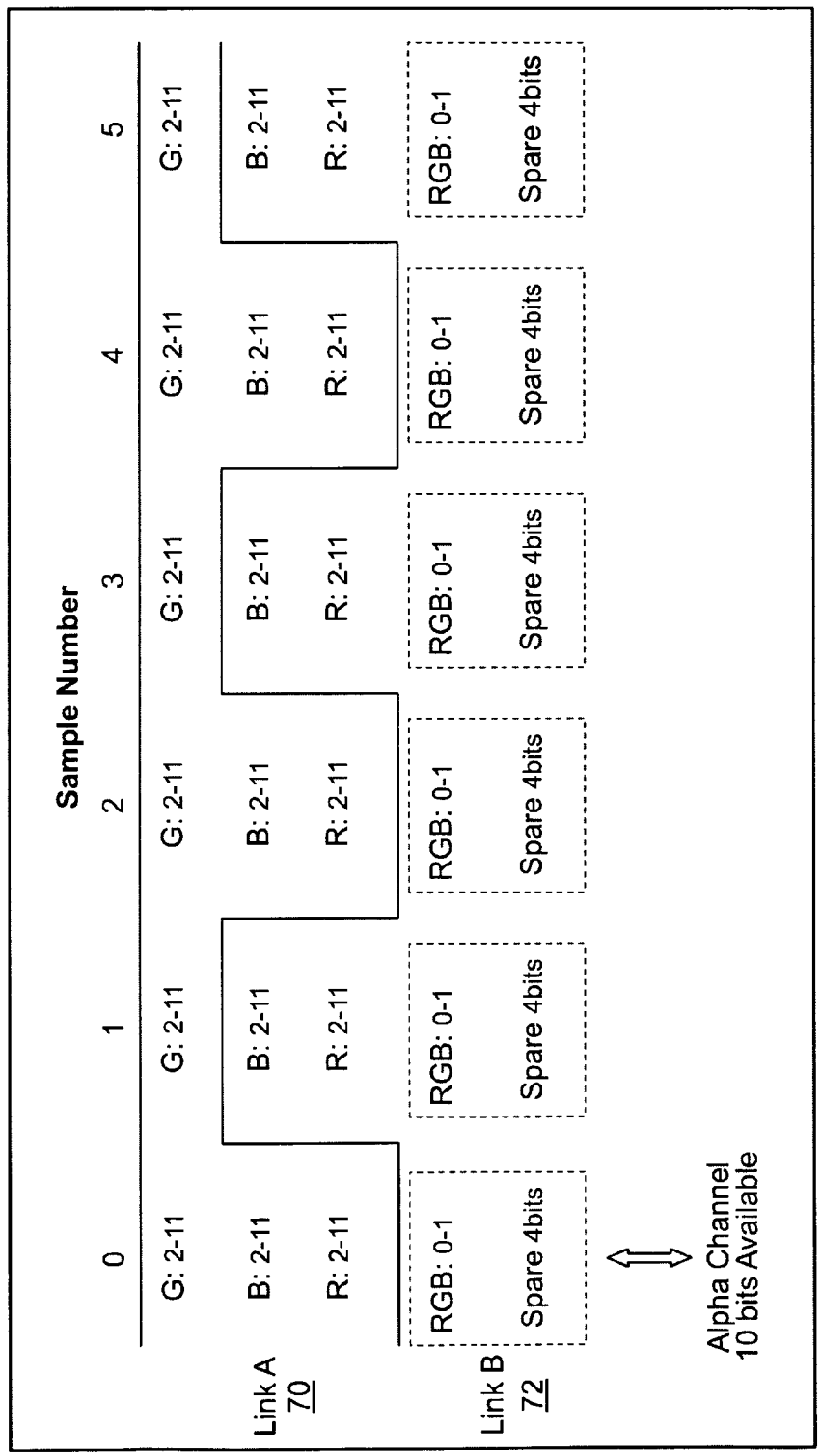
FIG. 9 is a diagram of a channel representation of RGB 12-bit color mode.

As illustrated in FIG. 9, in the case of RGB 12-bit signals according to SMPTE-372M, Link A 70 carries the most significant 10 bits of all the G samples plus the most significant 10 bits of B and R even-numbered samples. Link B 72 carries the most significant 10 bits of the B and R odd-numbered samples, plus the alpha channel, which contains the least significant two bits of the RGB samples along with four spare bits of data. Ten bits are available per sample in the alpha channel and only six are used by the least significant two bits of the RGB samples. Therefore, four spare bits per sample are available.

According to an embodiment of the invention, three spare bits among the four spare bits per sample are used to convey the HR components of the 4K image. The extra spare bit is used in order to avoid forbidden words. In the case of video displayed at 24 frames per second, the three spare bits per sample allow for 2048×1080×24×3=159,252 Mbits/s to be used for the compressed HR components. Compressed HR components only require about 30 Mbits/s. Therefore, the spare bit usage is sufficient to carry the HR components in the data stream.

Figure 10:
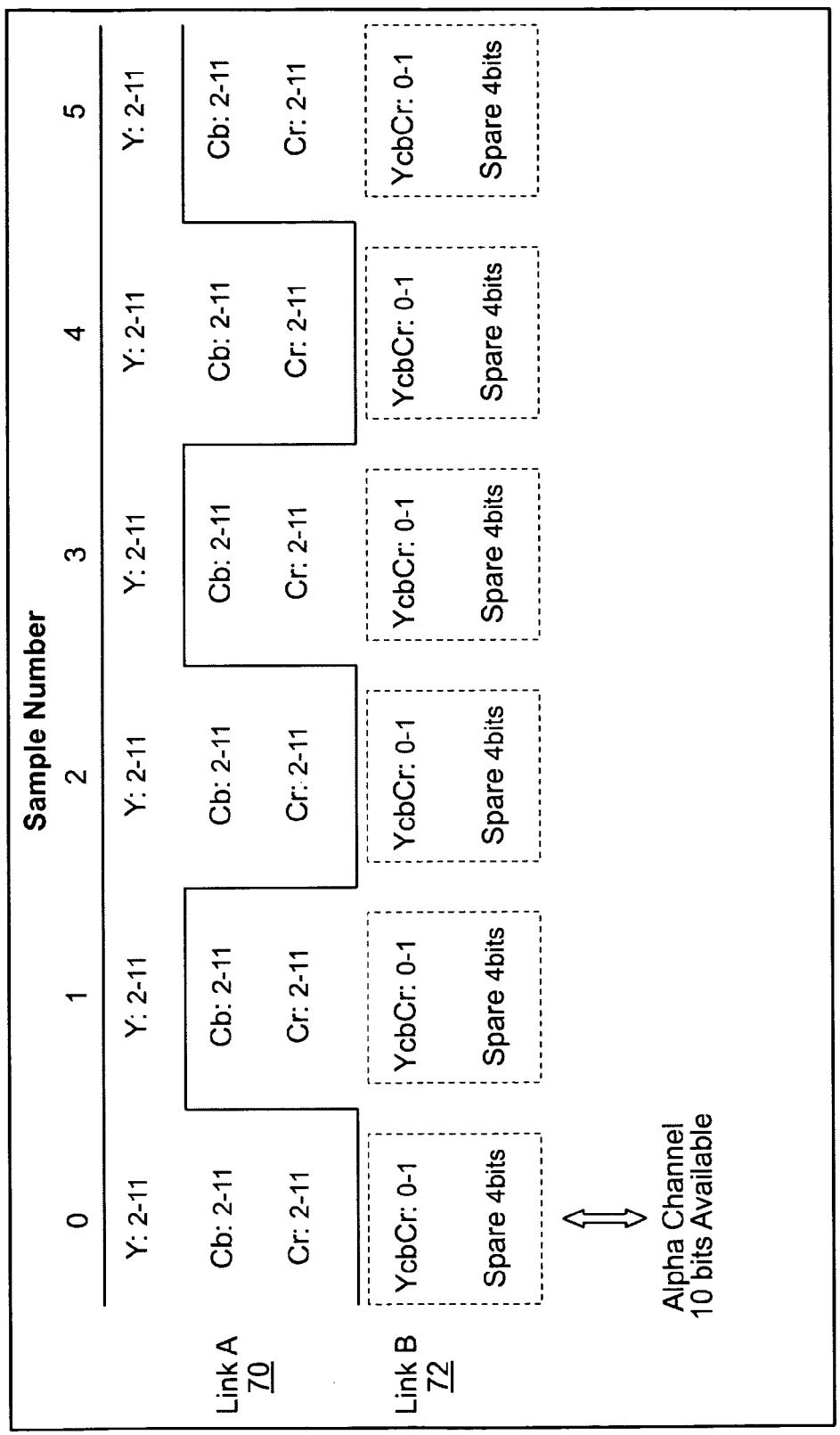
FIG. 10 is a diagram of a channel representation of YCbCr (4:4:4) 12-bit color mode.

Similarly, when the YCbCr (4:4:4) 12-bits color model is used, as defined in SMPTE-372M, the same spare bits may be used to carry the compressed HR component. FIG. 10 illustrates the channel representation for YCbCr (4:4:4) 12-bit signals. The Y, Cb, and Cr samples map into the same location in the frame as the R, G, and B samples, respectively. The same spare bits available for RGB are available for YCbCr in the alpha channel. Therefore, the same available bit rate can be used to convey the compressed HR component.

In another embodiment of the invention, ancillary data is used for transmission of the compressed HR component. Ancillary data as defined in SMPTE-291M provides a well defined structure to convey user data.

Figure 11:
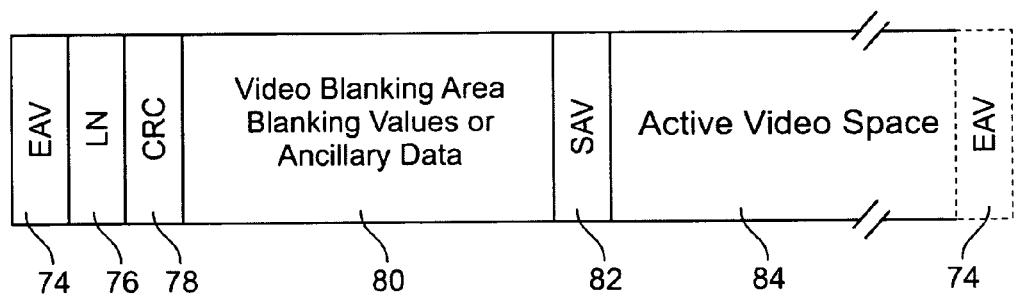
FIG. 11 is a diagram of a standard HD-SDI frame.

As illustrated in FIG. 11, each HD-SDI frame begins with an EAV (End of Active Video) 74, followed by the LN (Line Number) 76, CRC (Cyclic Redundancy Code) 78, and a video blanking area 80 that may contain ancillary data in conformance with SMPTE-291M. The video blanking area 80 is then followed by the SAV (Start of Active Video) 82, and subsequently followed by the active video space 84.

According to SMPTE-291M, two different types of ancillary data are available. Type 1 uses a DBN (data block number) and Type 2 uses a Secondary Data ID in addition to the common Data ID. It is preferred to use Type 2, as the secondary ID can then be used to identify the component type (e.g., R, G or B); however, it should be appreciated that the invention is not limited to one type.

Figure 12:
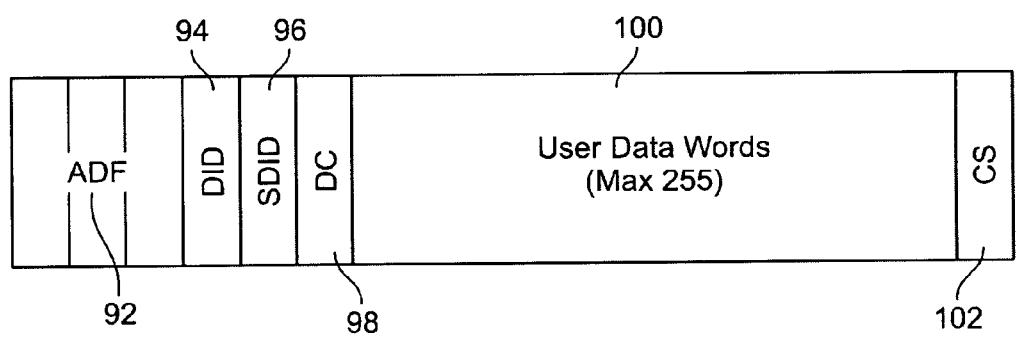
FIG. 12 is a diagram of a Type 2 ancillary data packet.

FIG. 12 illustrates the components of a Type 2 Ancillary (ANC) Data Packet 90, which is mapped into the blanking area 80 of the video frame. Every ANC packet 90 begins with a three-word ancillary data flag (ADF) 92. The word immediately after the ADF 92 contains the Data ID (DID) 94 value identifying the type of ANC packet 90. The word after the DID 94 contains the Secondary Data ID (SDID) 96 value. The SDID 96 value is combined with the DID 94 to provide a 15-bit packet identification code. The word following the SDID 96 contains the Data Count (DC) 98. The DC 98 indicates the number of words in the payload portion of the packet, which begins immediately after the DC 98 word. ANC packets 90 are restricted to a maximum of 255 payload words. The words in the payload section are called user data words (UDW) 100. User data words are not restricted to 8-bit values. All ten bits of each UDW 100 can be used. The checksum word (CS) 102 follows immediately after the last UDW 100. The CS 102 provides some error detection capabilities for the ANC packet 90.

In practice, if the DID 94 and SDID 96 are not recognized by an application, the ANC data packet 90 will simply be ignored. For the embodiment of the invention that uses the ancillary data to transport the compressed HR component, the DID 94 and SDID 96 will be recognized by the 2K to 4K circuit 66, and thus the ancillary data can be used to convey the compressed HR components.

An ancillary data packet 90 can contain up to 255 user data words of 10 bits each. According to SMPTE 292M, each HD-SDI connection has space for 2750 words per line. For transmitting the 2K resolution uncompressed portion of the 4K compressed image, 2048 words per line along with 12 words of EAV/LN/CRC/SAV are needed. Therefore, there remains 690 words available for the blanking area 80 to provide ancillary data packets (i.e., (2750−2048−12)=690 words). Each ancillary data packet 90 contains seven words of flags, IDs and checksum and can contain up to 255 user data words 100. Therefore, a full ancillary data packet 90 will contain 262 words (255+7=262). The 690 words available for ancillary data packets 90 can then convey two complete ancillary data packets and a third partially filled ancillary data packet containing only 159 user data words ((255×2)+159+(7×3)=690).

In the case of video displayed at 24 frames per second, the ancillary data packets 90 allow for ((255×2)+159)×1120×24×8=143,862 Mbits/s to be used for the transmission of the compressed HR components. In the previous calculations, ((255×2)+150) corresponds to the two complete ANC packets and one partial ANC packet previously mentioned. The value 1120 corresponds to the 1125 total lines per frame available in the HD-SDI link per SMPTE-292M. About two lines per frame may be reserved. Therefore, five lines are subtracted from the total number of lines available to provide a margin. The value 24 in the above formula represents the frame rate of 24 frames per second, while the 8 represents the 8 bits available for active data. Only 8 bits of active data are available among the total 10 bits of the bus as two bits are used for parity indication and prevention of forbidden words. The dual-link HD-SDI connection provides four ports of 10 bits each according to SMPTE-372M. Therefore, the available space is actually four times the amount calculated above, or 575,447 Mbits/s. Compressed HR components only require about 30 Mbits/s. Therefore, the ancillary data packets 90 are sufficient to carry the HR components in the data stream.

Figure 13:
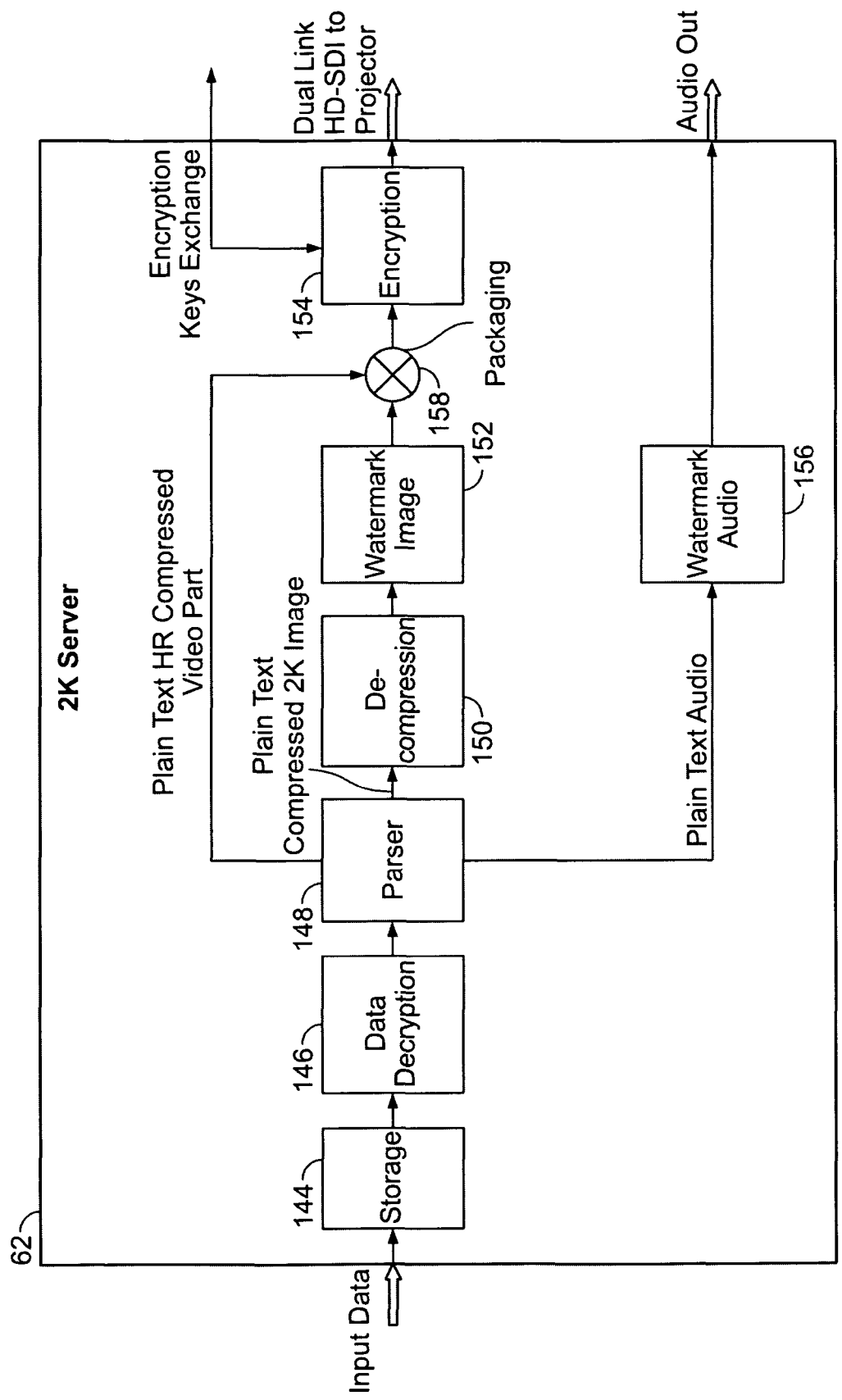
FIG. 13 is a block diagram of a 2K server according to an embodiment of the invention.

In an embodiment of the invention, a 2K server 62 is designed, as per the block diagram illustrated in FIG. 13. The 2K server 62 comprises a storage module 144, a data decryption module 146, a parser module 148, a decompression engine 150, an image watermarking module 152, a packaging module 158, an image physical link encryption module 154, and an audio watermarking module 156.

The 2K server 62 receives 4K resolution compressed data at its input and stores the compressed data in the storage module 144. The storage module 144 is coupled to the decryption module 146. If encrypted, the data is decrypted using a security key pre-loaded into the data decryption module 146. The decryption module 146 is coupled to the parser 148. The plain text data stream is then parsed to separate the data into a plain text audio component, a plain text compressed HR component, and a plain text compressed 2K resolution image. The audio separated by the parser 148 is coupled to the audio watermarking module 156. If watermarking (forensic or otherwise) is required, the audio is watermarked and transferred to an audio processing system. The plain text compressed 2K resolution image separated by the parser 148 is coupled to the decompression engine 150. The plain text compressed 2K resolution image stream is then decompressed into a plain text uncompressed 2K resolution image. The plain text compressed HR component remains compressed in order to be transferred more easily within the unused bits of the HD-SDI data stream. The decompression engine 150 is coupled to the image watermarking module 152. If an image watermark is required (forensic or otherwise), watermarking is applied to the plain text uncompressed 2K resolution image. The image watermarking module 152 is coupled to the packaging module 158. The plain text uncompressed 2K resolution image and the plain text compressed HR component are then packaged together into active data and unused bits in the dual-link HD-SDI data stream, respectively. The packaging module 158 is coupled to the encryption module 154. If physical link encryption is required, then encryption is applied to the data stream. The encryption module 154 is coupled to the dual-link HD-SDI connection and the data stream is then transmitted over the data interface.

In alternative embodiments of the invention, the following modules may be omitted: the storage module 144, data decryption module 146, image watermarking module 152, image physical link encryption module 154, and audio watermarking module 156. The modules may be omitted in order to utilize existing equipment that implement the desired function or may be omitted when the module function is not required. For example, if security is not an issue, encryption and decryption may be omitted. In addition, further devices such as storage, watermarking or encryption apparatus may be inserted between the server and the projector in order to make the system more flexible. For example, an external storage device would allow for larger storage capacities to be easily replaced in the system without the need to replace the 2K server when higher storage devices become available on the market.

Figure 14:
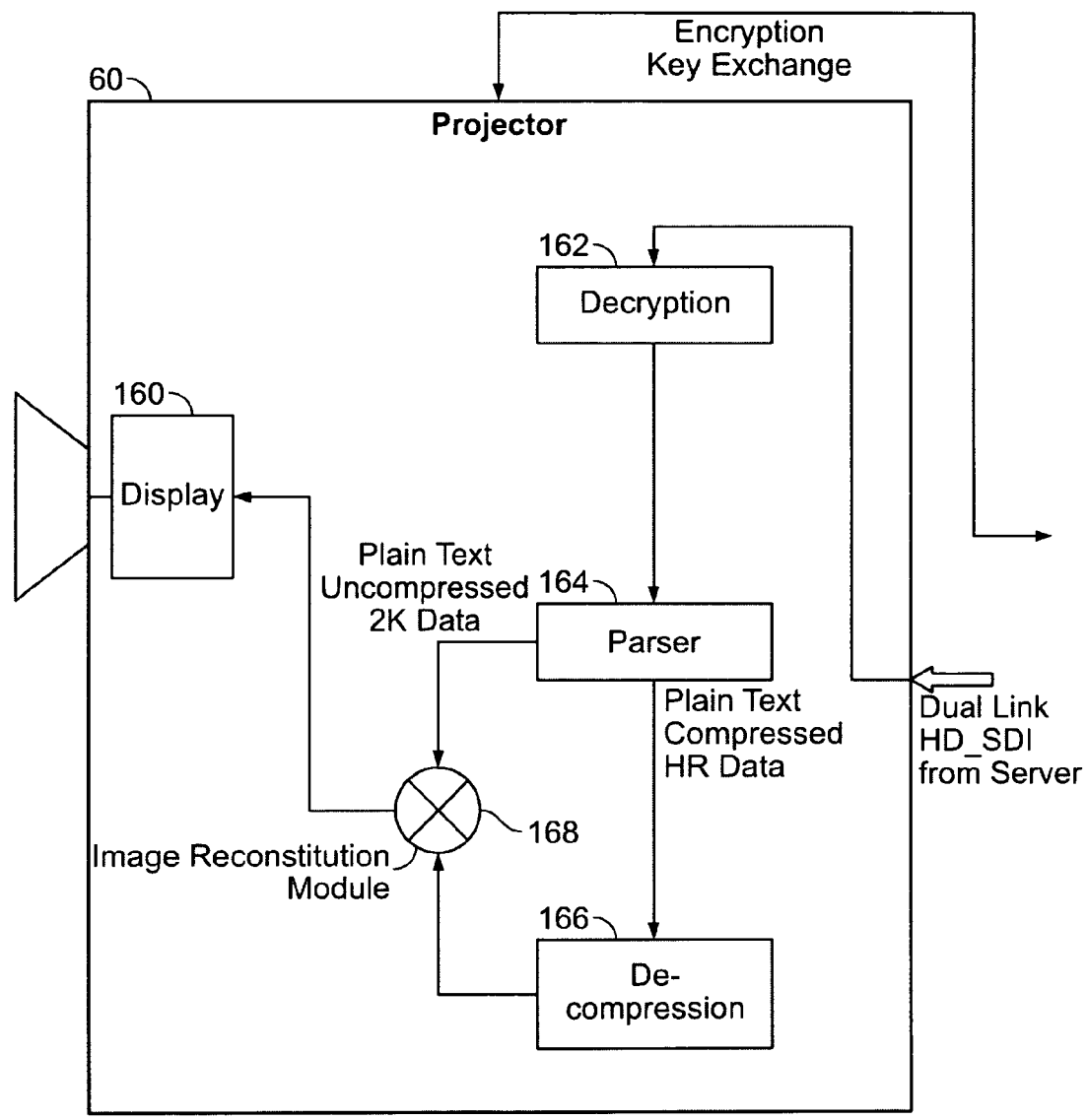
FIG. 14 is a block diagram of a 4K projector according to an embodiment of the invention.

In an embodiment of the invention, an exemplary display device, i.e., projector 60, is illustrated in the block diagram of FIG. 14. The 4K digital projector 60 comprises the following modules: a data decryption module 162, a parser module 164, a decompression engine 166, an image reconstitution module 168, and a display 160.

The 4K digital projector 60 receives a dual-link HD-SDI data stream containing a 4K resolution image as uncompressed 2K resolution data encoded in the active data and a compressed HR component encoded into unused bits of the HD-SDI data stream. The data interface connects to the decryption module 162. If encrypted, the data is decrypted using a security key pre-loaded into the data decryption module 162. The decryption module 162 is coupled to the parser 164. The data stream is then parsed to separate the data into a plain text compressed HR component, and a plain text uncompressed 2K resolution image. The plain text compressed HR component separated by the parser 164 is coupled to the decompression engine 166. The plain text compressed HR component is then decompressed into a plain text uncompressed HR component. The decompression engine 166 is coupled to the reconstitution module 168, which is coupled to the display 160. The plain text uncompressed 2K resolution image and the plain text uncompressed HR component are then reconstituted together into plain text uncompressed 4K resolution data, which is then transmitted to the display 160 for viewing. Typically, reconstitution is achieved by using an inverse wavelet transform to reconstruct the 4K resolution image.

An alternate embodiment of the invention implements a data decryption module 162, parser module 164, decompression engine 166, and image reconstitution module 168 in the same manner described above, only in a stand-alone conversion apparatus. The stand-alone apparatus would connect between a standard 4K digital display device and the 2K server according to the invention in order to convert the proprietary format into a standard format to utilize existing equipment.

In alternative embodiments of the display device and stand-alone conversion apparatus, the decryption module 162 may be omitted if security is not required. Alternatively, further equipment such as an encryption apparatus may be inserted between the server and the display device or conversion apparatus in order to make the system more flexible. External encryption apparatus allows the system to adapt easier to new encryption algorithms.

In an alternative embodiment of the invention, the unused bits of a dual-link HD-SDI stream can also be used also to convey high frame rate content, such as 2K resolution 4:4:4 12-bit quality stereoscopic images, in a method similar to that of conveying a 4K resolution image. In the case of a YCbCr color model, the stereoscopic Yleft and Yright samples correspond to the left eye luminance and to the right eye luminance, respectively, and can be transmitted as uncompressed video similar to the 2K resolution uncompressed component previously described. The Cb and Cr samples for both eyes are transmitted in compressed form in the same way the HR components are transmitted for a 4K resolution image. Both eye streams may be encoded into the same dual-link HD-SDI connection according to the foregoing embodiments presented for a 4K resolution image. Likewise, high frame rate non-stereoscopic content can be broken down into first frame and second frame components similar to the right eye and left eye components done for stereoscopic content.

As illustrated in FIG. 15, Link A 70 carries all 12 bits of left eye luminance or Yleft samples. Link B 72 carries all 12 bits of the right eye luminance or Yright samples. Each HD-SDI link sample is comprised of 20 bits and the luminance component uses 12 of those 20 bits. One spare bit is used in order to avoid forbidden words; therefore, at least seven spare bits per sample are available.

In an embodiment of the invention, the seven spare bits are used to transmit the Cb and Cr compressed components of stereoscopic content while the uncompressed Y samples are encoded as active data. In the case of video displayed at 24 frames per second, the seven spare bits per pixel allow for 2048×1080×24×7=371,589 Mbits/s to be used for the compressed Cb and Cr components. DCI requires that an entire compressed stream be limited to no more than 250 Mbits/s. Therefore, the spare bit usage is sufficient to carry the Cb and Cr components in the data stream.

In an alternate embodiment of the invention, ancillary data is used to transmit the Cb and Cr compressed components of stereoscopic content while the Y samples remain encoded as active data. The same principles as presented for a 4K resolution image can be used. As illustrated in FIG. 12, the UDW may be used to carry the compressed Cb and Cr components just as was described for the compressed HR component.

The same calculation as the one performed in the case of 4K video can be used. In the case of video displayed at 24 frames per second, the ancillary data packets 90 allow for ((255×2)+159)×1120×24×8=143,862 Mbits/s to be used for the transmission of the compressed Cb and Cr components. As the dual-link HD-SDI connection provides four ports of 10 bits each according to SMPTE-372M, the available space is actually four times the amount calculated above, or 575,447 Mbits/s. DCI requires that an entire compressed stream be limited to no more than 250 Mbits/s. Therefore, the ancillary packet usage is sufficient to carry the Cb and Cr components in the data stream.

Figure 16:
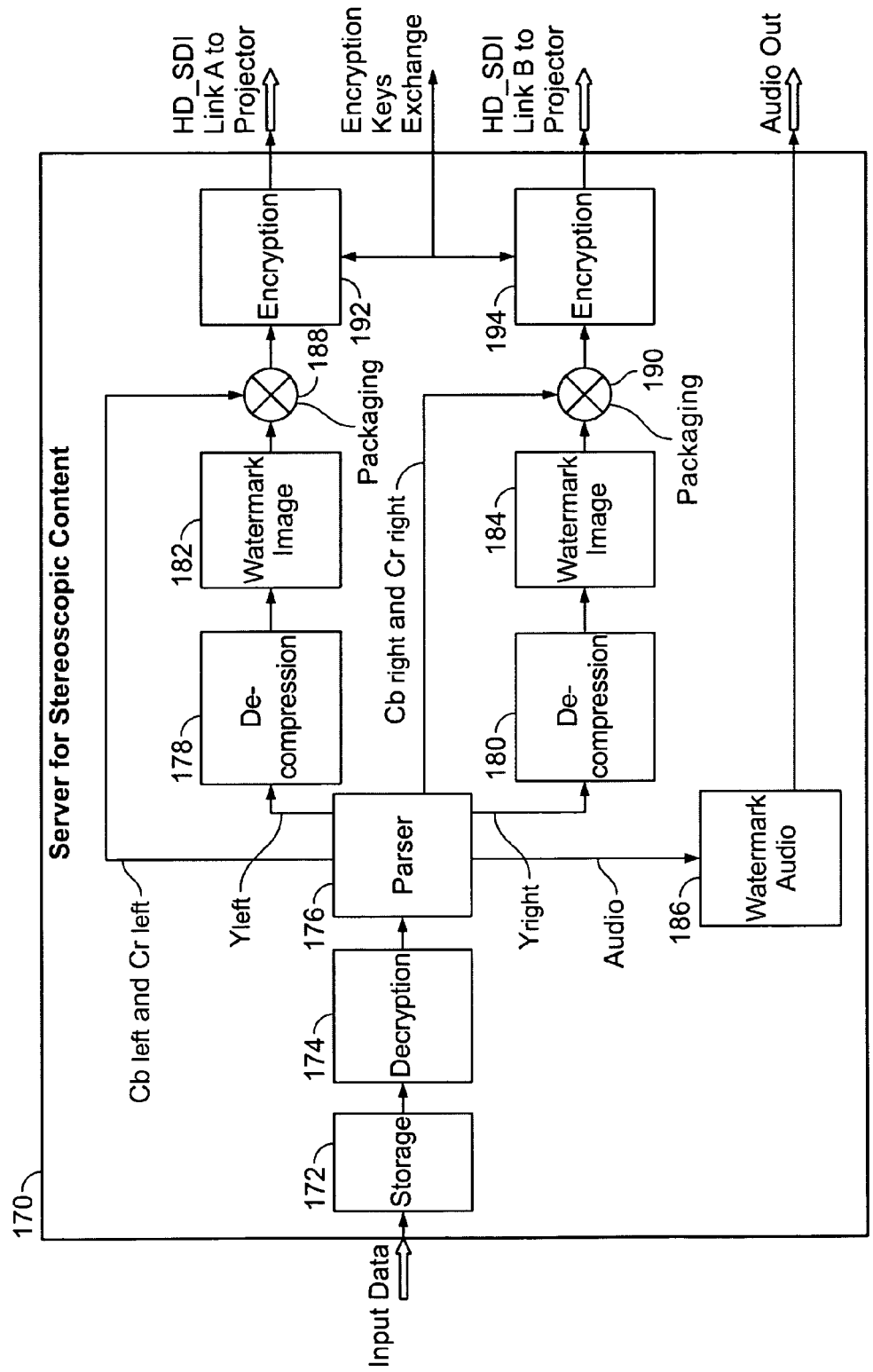
FIG. 16 is a block diagram of a 2K stereoscopic server according to an embodiment of the invention.

In an embodiment of the invention, a 2K server 170 is illustrated in the block diagram of FIG. 16. The 2K server 170 comprises the following modules: a storage module 172, a data decryption module 174, a parser module 176, two decompression engines 178, 180, two image watermarking modules 182, 184, two packaging modules 188, 190, two image physical link encryption modules 192, 194, and an audio watermarking module 186.

The 2K server 170 receives compressed stereoscopic data at its input and stores the compressed file in the storage module 172. The storage module 172 is coupled to the decryption module 174. If encrypted, the data is decrypted using a security key pre-loaded into the data decryption module 174. The decryption module 174 is coupled to the parser 176. The data stream is then parsed to separate the data into plain text compressed Cb left and Cr left components, a plain text compressed Yleft component, plain text compressed Cb right and Cb right components, a plain text compressed Yright component, and plain text audio. The audio separated by the parser 176 is coupled to the audio watermarking module 186. If watermarking (forensic or otherwise) is required, the audio is watermarked and transferred to an audio processing system. The plain text compressed Yleft image stream separated by the parser 176 is coupled to the first decompression engine 178 while the plain text compressed Yright image stream is coupled to the second decompression engine 180. The plain text compressed Yleft and Yright image streams are then decompressed into plain text uncompressed Yleft and Yright components, respectively. The plain text compressed Cb and Cr components remain compressed in order to be transferred more easily within the unused bits of the HD-SDI data stream. The first and second decompression engines 178, 180 are coupled to the first and second image watermarking modules 182, 184, respectively. If an image watermark is required (forensic or otherwise), watermarking is applied to the plain text uncompressed Yleft and Yright components. The first and second image watermarking modules 182, 184 are coupled to the first and second packaging modules 188, 190, respectively. The plain text uncompressed Yleft component and the plain text compressed Cb left and Cr left components are then packaged together into active data and unused bits in the dual-link HD-SDI data stream, respectively. Similarly, the plain text uncompressed Yright component and the plain text compressed Cb right and Cr right components are packaged together into active data and unused bits in the dual-link HD-SDI data stream, respectively. The first and second packaging modules 188, 190 are coupled to the first and second encryption modules 192, 194, respectively. If physical link encryption is required, then encryption is applied to the data streams. The encryption modules 192, 194 are coupled to the two links of the dual-link HD-SDI connection and the data stream is then transmitted over the data interface.

In alternative embodiments of the invention, the following modules may be omitted: the storage module 172, data decryption module 174, image watermarking modules 182, 184, image physical link encryption modules 192, 194, and audio watermarking module 186. The modules may be omitted in order to utilize existing equipment that implement the desired function or may be omitted when the module function is not required. For example, if security is not an issue, encryption and decryption may be omitted. In addition, further devices such as storage, watermarking or encryption apparatus may be inserted between the server and the projector in order to make the system more flexible. For example, an external storage device would allow for larger storage capacities to be easily replaced in the system without the need to replace the 2K server when higher storage devices become available on the market.

Figure 17:
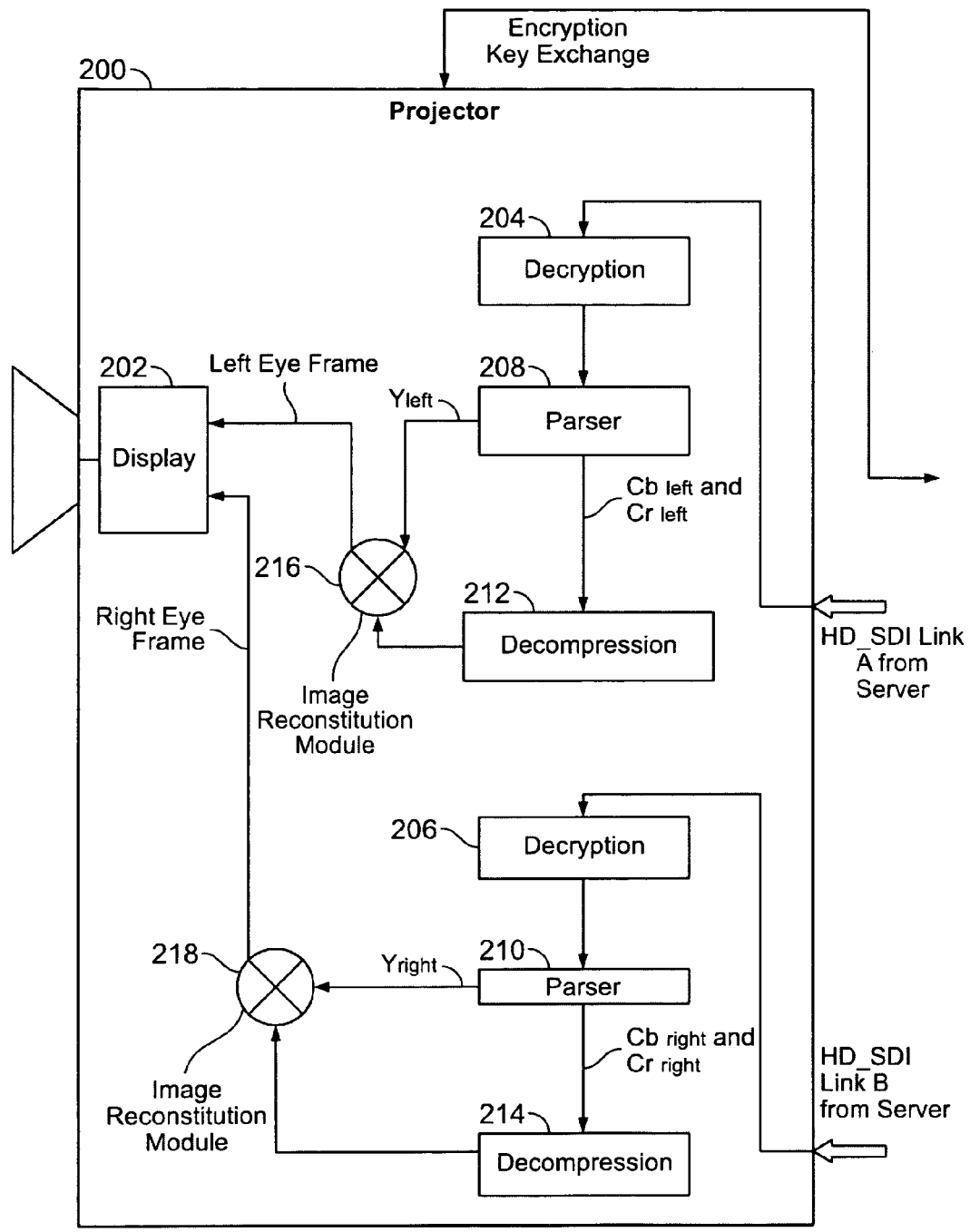
FIG. 17 is a block diagram of a 4K stereoscopic projector according to an embodiment of the invention.

In an embodiment of the invention, a stereoscopic projector 200 is illustrated in the block diagram of FIG. 17. The digital stereoscopic projector 200 comprises the following modules: two data decryption modules 204, 206, two parser modules 208, 210, two decompression engines 212, 214, two image reconstitution modules 216, 218, and a display 202.

The digital stereoscopic projector 200 receives a dual-link HD-SDI data stream containing a stereoscopic image separated into right and left eye components and encoded as uncompressed Y sample data in the active data and compressed Cb and Cr components encoded into unused bits of the HD-SDI data stream. The two links of the data interface connect to the first and second decryption modules 204, 206, respectively. If encrypted, the data is decrypted using a security key pre-loaded into the data decryption modules 204, 206. The first and second decryption modules 204, 206 are coupled to the first and second parsers 208, 210, respectively. The data streams are then parsed to separate the data into plain text compressed Cb and Cr components, and a plain text uncompressed Y component. The plain text compressed Cb and Cr components separated by the parsers 204, 206 are coupled to the first and second decompression engines 212, 214, respectively. The plain text compressed Cb and Cr components are then decompressed into plain text uncompressed Cb and Cr components. The first and second decompression engines 212, 214 are coupled to the first and second reconstitution modules 216, 218, respectively, which are then coupled to the display 160. The plain text uncompressed Y component and the plain text uncompressed Cb and Cr components are then reconstituted together for each eye component into plain text uncompressed right and left eye data, which is then transmitted to the display 202 for viewing. Typically, reconstitution is achieved by using an inverse wavelet transform to reconstruct the right and left eye stereoscopic images.

An alternate embodiment of the invention implements the data decryption modules 204, 206, parser modules 208, 210, decompression engines 212, 214, and image reconstitution modules 216, 218 in the same manner described above, only in a stand-alone conversion apparatus. The stand-alone apparatus would connect between a standard stereoscopic projector and the stereoscopic server according to the invention in order to convert the proprietary format into a standard format to utilize existing equipment.

In alternative embodiments of the projector and stand-alone conversion apparatus, the decryption modules 204, 206 may be omitted if security is not required. Alternatively, further equipment such as an encryption apparatus may be inserted between the server and the projector or conversion apparatus in order to make the system more flexible. External encryption apparatus allows the system to adapt easier to new encryption algorithms.

Having thus described a preferred embodiment of a method and apparatus for serving high resolution images and high frame rate content, it should be apparent to those skilled in the art that certain advantages of the described method and system have been achieved. It should also be appreciated that various modifications, adaptations, and alternative embodiments thereof may be made within the scope and spirit of the present invention. For example, high resolution images and high frame rate images have been illustrated, but it should be apparent that the inventive concepts described above would be equally applicable to any resolution image or frame rate. The invention is defined solely by the following claims.

What is claimed is:

1. A method for serving audiovisual content, comprising:
   receiving an image data file;
   parsing said image data file into a first compressed image component and a second compressed image component;
   decompressing said first compressed image component into an uncompressed image component;
   packaging said uncompressed image component into a data stream having plural data fields arranged in a format defined in accordance with an industry-accepted standard and said second compressed image component into unused ones of said plural data fields; and transmitting said data stream over a data interface.

2. The method of claim 1, further comprising decrypting said image data file.

3. The method of claim 1, further comprising storing said image data file.

4. The method of claim 1, further comprising encrypting said data stream prior to said transmitting step.

5. The method of claim 1, further comprising watermarking of said uncompressed image component.

6. The method of claim 1, wherein said packaging step further comprises packaging said second compressed image component into ancillary data.

7. The method of claim 1, wherein said packaging step further comprises packaging said second compressed image component into spare bits in an active video space.

8. The method of claim 1, wherein said transmitting step further comprises transmitting over a dual-link High-Definition Serial Digital Interface connection.

9. The method of claim 1, wherein said receiving step further comprises receiving a stereoscopic image data file.

10. The method of claim 9, wherein said first compressed image component comprises a compressed luminance component and said second compressed image component comprises a compressed color component.

11. The method of claim 1, wherein said receiving step further comprises receiving a high resolution image data file.

12. The method of claim 11, wherein said second compressed image component comprises a compressed high resolution enhancement component.

13. A method for serving audiovisual content, comprising:
receiving an image data file;
parsing said image data file into a first compressed image component and a second compressed image component;
decompressing said first compressed image component into an uncompressed image component;
packaging said uncompressed image component into a data stream having plural data fields arranged in a format defined in accordance with an industry-accepted standard and said second compressed image component into unused ones of said plural data fields; and
transmitting said data stream over a data interface;
wherein said parsing step further comprises parsing said compressed luminance component into a compressed right luminance component and a compressed left luminance component and parsing said compressed color component into a compressed right color component and a compressed left color component.

14. The method of claim 13, wherein said decompression step further comprises left decompression and right decompression.

15. The method of claim 13, wherein said packaging step further comprises left packaging and right packaging.

16. The method of claim 13, wherein said transmission step further comprises left transmission and right transmission.

17. The method of claim 13, further comprising encrypting said data stream prior to said transmitting step.

18. The method of claim 17, wherein said encrypting step further comprises left encrypting and right encrypting.

19. The method of claim 13, further comprising watermarking of said uncompressed image component.

20. The method of claim 19, wherein said watermarking step further comprises left watermarking and right watermarking.

21. The method of claim 1, wherein said parsing step further comprises parsing an audio component.

22. The method of claim 21, further comprising watermarking of said audio component.

23. A method for serving audiovisual content, comprising:
receiving an image data file
parsing said image data file into a first compressed image component and a second compressed image component;
decompressing said first compressed image component into an uncompressed image component;
packaging said uncompressed image component into a data stream having plural data fields arranged in a format defined in accordance with an industry-accepted standard and said second compressed image component into unused ones of said plural data fields; and
transmitting said data stream over a data interface
wherein said receiving step further comprises receiving a high frame rate image data file;
wherein said first compressed image component comprises a compressed luminance component and said second compressed image component comprises a compressed color component; and
wherein said parsing step further comprises parsing said compressed luminance component into a compressed first luminance component and a compressed second luminance component and parsing said compressed color component into a compressed first color component and a compressed second color component.

24. An apparatus for serving audiovisual content, comprising:
a parser adapted to receive an image data file and separate said image data file into a first compressed image component and a second compressed image component;
a decompression module coupled to said parser and adapted to decompress said first compressed image component into an uncompressed image component;
a packaging module coupled to said decompression module and adapted to package said uncompressed image component into a data stream having plural data fields arranged in a format defined in accordance with an industry-accepted standard and said second compressed image component into unused ones of said plural data fields, and
a transmission module coupled to said packaging module and adapted to transmit said data stream over said data interface.

25. The apparatus of claim 24, further comprising a decryption module coupled to said parser that decrypts said image data file.

26. The apparatus of claim 24, further comprising a storage module coupled to said parser that stores said image data file.

27. The apparatus of claim 24, further comprising an encryption module coupled to said packaging module that encrypts said data stream prior to said transmission.

28. The apparatus of claim 24, further comprising an image watermarking module coupled to said decompression module that watermarks said uncompressed image component.

29. The apparatus of claim 24, wherein said parser further separates said image data file into an audio component.

30. The apparatus of claim 29, further comprising an audio watermarking module coupled to said parser that watermarks said audio component.

31. The apparatus of claim 24, wherein said unused ones of said plural data fields comprises ancillary data.

32. The apparatus of claim 24, wherein said data stream further comprises an active video space and wherein said unused ones of said plural data fields comprises spare bits in said active video.

33. The apparatus of claim 24, wherein said data interface comprises a dual-link High-Definition Serial Digital Interface connection.

34. The apparatus of claim 24, wherein said image data file comprises stereoscopic content.

35. The apparatus of claim 34, wherein said first compressed image component comprises a compressed luminance component and said second compressed image component comprises a compressed color component.

36. The apparatus of claim 24, wherein said image data file comprises high resolution content.

37. The apparatus of claim 36, wherein said second compressed image component comprises a compressed high resolution enhancement component.

38. An apparatus for serving audiovisual content, comprising:
- a parser adapted to receive an image data file and separate said image data file into a first compressed image component and a second compressed image component;
- a decompression module coupled to said parser and adapted to decompress said first compressed image component into an uncompressed image component;
- a packaging module coupled to said decompression module and adapted to package said uncompressed image component into a data stream having plural data fields arranged in a format defined in accordance with an industry-accepted standard and said second compressed image component into unused ones of said plural data fields, and
- a transmission module coupled to said packaging module and adapted to transmit said data stream over said data interface;
- wherein said parser is adapted to further separate said compressed luminance component into a compressed right luminance component and a compressed left luminance component and further separate said compressed color component into a compressed right color component and a compressed left color component.

39. The apparatus of claim 38, wherein said decompression module further comprises a left decompression module and a right decompression module.

40. The apparatus of claim 38, wherein said packaging module further comprises a left packaging module and a right packaging module.

41. The apparatus of claim 38, wherein said transmission module further comprises a left transmission module and a right transmission module.

42. The apparatus of claim 38, further comprising an encryption module coupled to said packaging module that encrypts said data stream prior to said transmission.

43. The apparatus of claim 42, wherein said encryption module further comprises a left encryption module and a right encryption module.

44. The apparatus of claim 38, further comprising an image watermarking module coupled to said decompression module that watermarks said uncompressed image component.

45. The apparatus of claim 44, wherein said watermarking module further comprises a left watermarking module and a right watermarking module.

46. An apparatus for serving audiovisual content, comprising:
- a parser adapted to receive an image data file and separate said image data file into a first compressed image component and a second compressed image component;
- a decompression module coupled to said parser and adapted to decompress said first compressed image component into an uncompressed image component;
- a packaging module coupled to said decompression module and adapted to package said uncompressed image component into a data stream having plural data fields arranged in a format defined in accordance with an industry-accepted standard and said second compressed image component into unused ones of said plural data fields, and
- a transmission module coupled to said packaging module and adapted to transmit said data stream over said data interface;
- wherein said image data file comprises high frame rate content;
- wherein said first compressed image component comprises a compressed luminance component and said second compressed image component comprises a compressed color component; and
- wherein said parser is adapted to further separate said compressed luminance component into a compressed first luminance component and a compressed second luminance component and further separate said compressed color component into a compressed first color component and a compressed second color component.

* * * * *